US 9,924,111 B2

(12) United States Patent
Matsunaga

(10) Patent No.: US 9,924,111 B2
(45) Date of Patent: Mar. 20, 2018

(54) IMAGE COMPOSITING APPARATUS

(71) Applicant: Olympus Corporation, Hachioji-shi, Tokyo (JP)

(72) Inventor: Takuya Matsunaga, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/337,374

(22) Filed: Oct. 28, 2016

(65) Prior Publication Data

US 2017/0142344 A1   May 18, 2017

(30) Foreign Application Priority Data

Nov. 18, 2015   (JP) .................................. 2015-226044

(51) Int. Cl.
 | | |
 |---|---|
 | *G02B 13/16* | (2006.01) |
 | *H04N 5/225* | (2006.01) |
 | *H04N 5/265* | (2006.01) |
 | *H04N 5/232* | (2006.01) |
 | *G06T 5/00* | (2006.01) |

(52) U.S. Cl.
CPC ............. *H04N 5/265* (2013.01); *G06T 5/006* (2013.01); *H04N 5/23296* (2013.01)

(58) Field of Classification Search
CPC .. H04N 5/265; H04N 5/23296; H04N 5/2624; H04N 5/2628; G06T 5/006
USPC ................ 348/335, 340, 345, 348, 350, 352
See application file for complete search history.

(56) References Cited

U.S. PATENT DOCUMENTS

| | | | |
|---|---|---|---|
| 2008/0259176 A1 | 10/2008 | Tamaru | |
| 2010/0199214 A1* | 8/2010 | Mikawa ................ | G06F 3/0481 715/800 |
| 2015/0181128 A1* | 6/2015 | Kaku ..................... | G02B 7/102 348/143 |

FOREIGN PATENT DOCUMENTS

| | | |
|---|---|---|
| JP | 2001/257932 | 9/2001 |
| JP | 2008/271240 | 11/2008 |
| JP | 2009/105621 | 5/2009 |

\* cited by examiner

*Primary Examiner* — Yogesh Aggarwal
(74) *Attorney, Agent, or Firm* — John C. Pokotylo; Pokotylo Patent Services

(57) ABSTRACT

A focal difference magnification calculation processor, a distortion correction magnification calculation processor, a magnification correction value calculation processor that calculates a magnification correction value that corrects a magnification of the plurality of images so that image heights of the plurality of images are consistent, and an area determination processor that determines an area used as an image for an image composition from among the plurality of images whose magnification was corrected by the magnification correction value are included, and the area determination processor determines an image that results in a minimum magnification correction value from among the plurality of images, and determines the area.

7 Claims, 12 Drawing Sheets

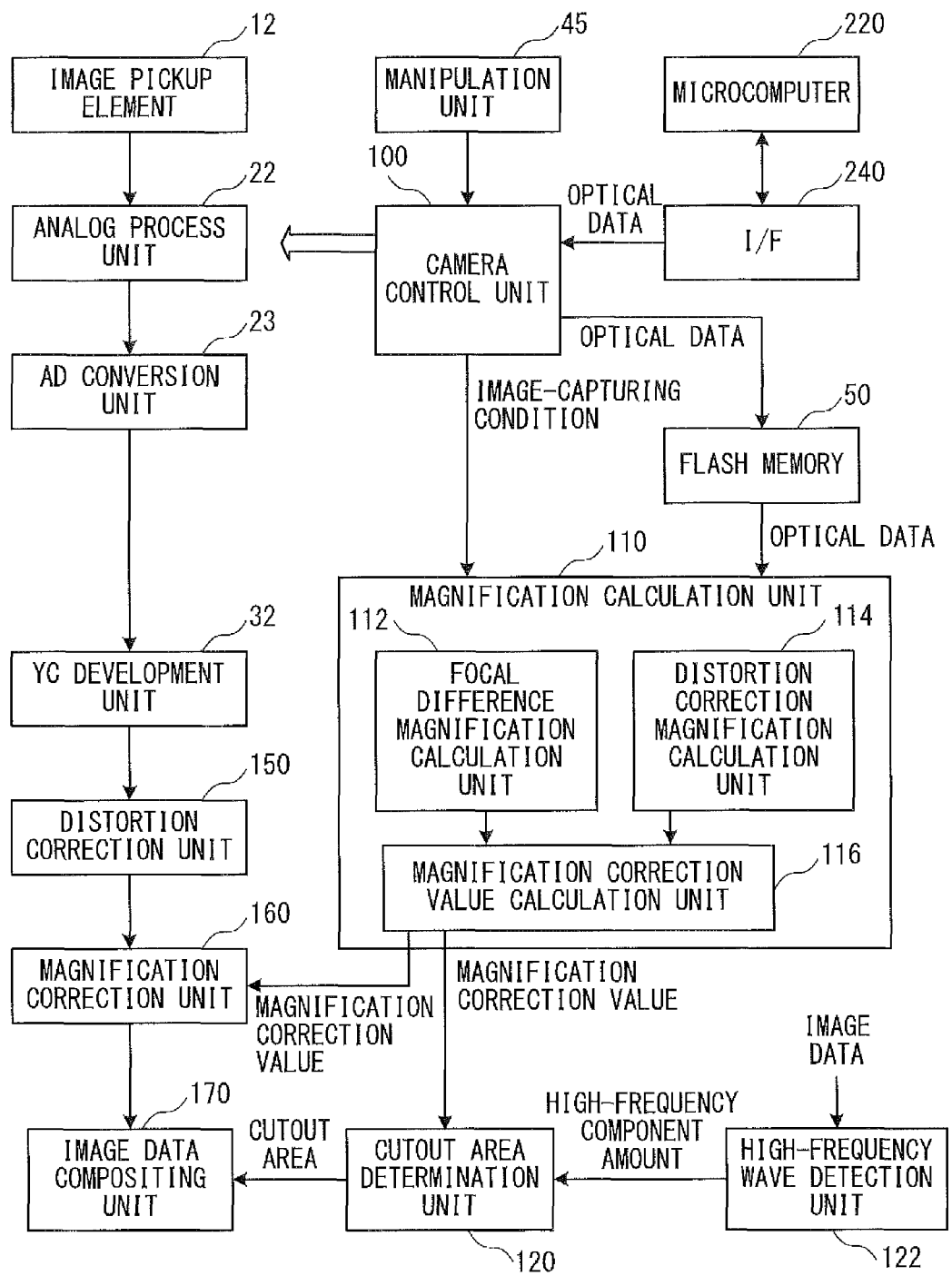
F I G. 2

IMAGE COMPOSITING APPARATUS

CROSS-REFERENCE TO RELATED APPLICATIONS

This application is based upon and claims the benefit of priority of the prior Japanese Patent Application No. 2015-226044, filed on Nov. 18, 2015, the entire contents of which are incorporated herein by reference.

BACKGROUND OF THE INVENTION

Field of the Invention

The present invention is related to an image compositing apparatus that composes a plurality of images captured while changing focal positions.

Description of the Related Art

Image capturing apparatuses such as a digital camera etc., have a function of obtaining a plurality of pieces of image data so as to achieve image quality that cannot be achieved by a single image. Patent Document 1 discloses a technique of obtaining a plurality of pieces of image data by moving the focal position and composing the obtained pieces of image data so as to obtain an image with a large depth of field. This type of photography is also referred to as focus bracketing photography.

It is known that magnification changes in images are caused by image-pickup optical systems and that optical aberrations occur in different amounts between pieces of image data of different focal positions. For example, Patent Document 2 discloses a technique of correcting each of a plurality of pieces of image data on the basis of data that is obtained by quantifying these aberrations in advance. Further, a distortion aberration and a chromatic aberration of magnification, which depend upon the image height, occur in a captured image in response to the lens characteristic. Also, Patent Document 3 discloses a magnification changing process for correcting a magnification change caused by aberration correction because the above aberration correction changes the magnification.

[Patent Document 1] Japanese Laid-open Patent Publication No. 2008-271240
[Patent Document 2] Japanese Laid-open Patent Publication No. 2001-257932
[Patent Document 3] Japanese Laid-open Patent Publication No. 2009-105621

SUMMARY OF THE INVENTION

An image compositing apparatus for generating a composite image by composing a plurality of images captured while changing a focal position, the apparatus including: a focal difference magnification calculation processor that calculates, for the plurality of images, a focal difference magnification, which is a magnification that changes in accordance with a difference between focal positions at which images are captured; a distortion correction magnification calculation processor that calculates, for the plurality of images, a distortion correction magnification, which is a magnification that changes when an image distortion in accordance with a focal position at which an image is captured is corrected; a magnification correction value calculation processor that calculates, for the plurality of images, a magnification correction value that corrects a magnification of the plurality of images so that image heights of the plurality of images that are changed by the focal difference magnification and the distortion correction magnification are consistent; and an area determination processor that determines an area used as an image for an image composition from among the plurality of images whose magnification was corrected by the magnification correction value, wherein the area determination processor determines an image that results in a corresponding minimum magnification correction value from among the plurality of images so as to determine the area on the basis of the determined image by comparing magnification correction values respectively calculated for the plurality of images in a case when the image after correction becomes relatively smaller in a case when the magnification correction value is small.

BRIEF DESCRIPTION OF THE DRAWINGS

FIG. 2 is a functional block diagram related to an image compositing process.

DETAILED DESCRIPTION OF THE PREFERRED EMBODIMENTS

Figure 1:
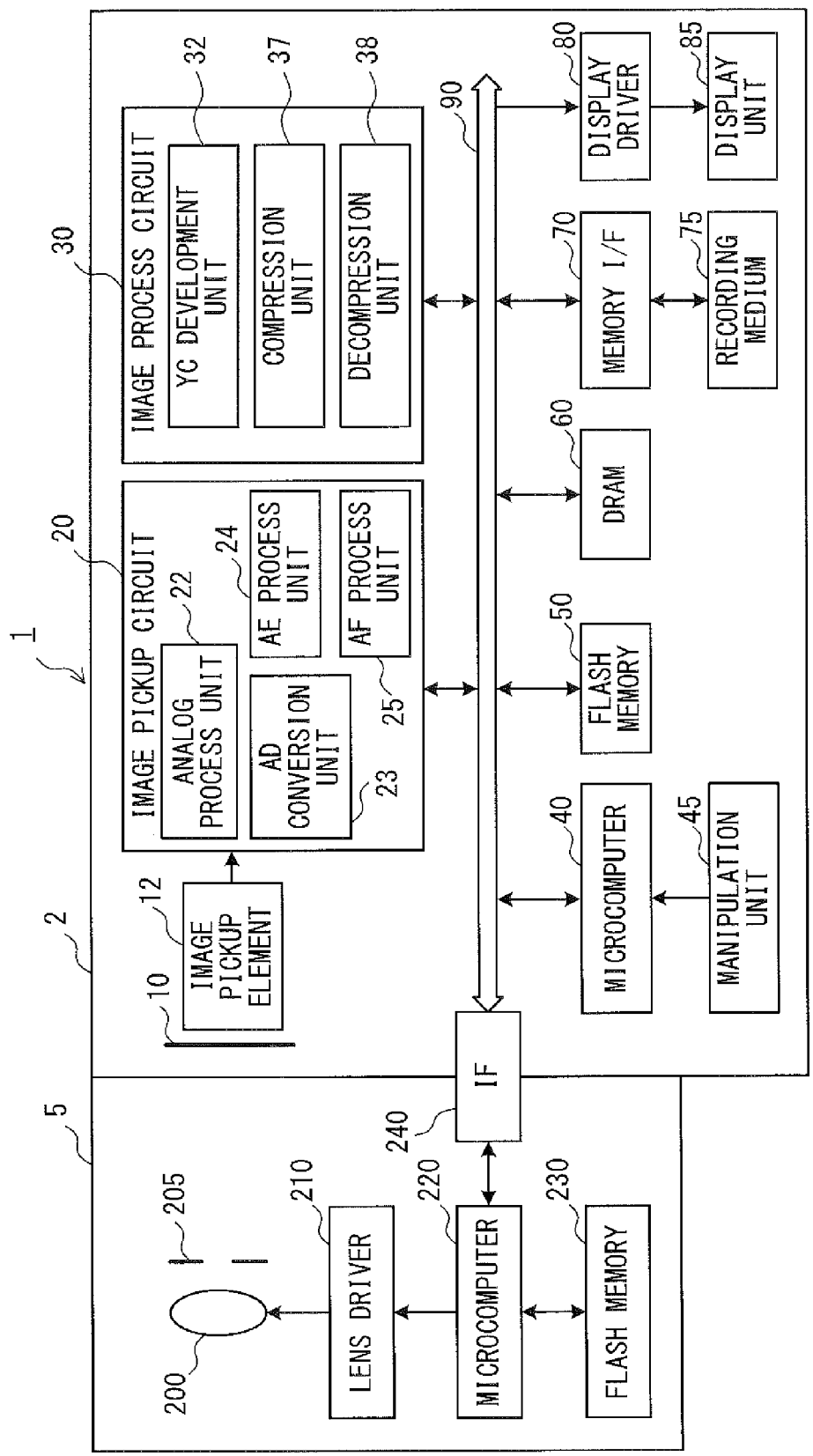
FIG. 1 is a hardware block diagram showing a configuration example of a camera.

Hereinafter, explanations will be given for the embodiments of the present invention by referring to the drawings. FIG. 1 is a hardware block diagram showing a configuration example of a camera 1. An image compositing apparatus according to the present embodiment is mounted on the camera 1.

The camera 1 includes a camera main body 2 and an interchangeable lens device 5 that can be removed from the camera main body 2. While explanations will be given for the present embodiment on an assumption that the lens device 5 is an interchangeable lens type, the scope is not limited to this and the lens device 5 may be a type that is fixed to the camera main body 2.

The lens device 5 includes an image pickup lens 200, a diaphragm 205, a lens driver 210, a microcomputer 220, a flash memory 230 and an interface (referred to as an I/F hereinafter) 240.

The image pickup lens 200 includes a plurality of optical lenses for forming a subject image (including a focus lens for adjusting the focus and a zoom lens for adjusting a focal length). Note that the image pickup lens 200 may be a single focus lens. The diaphragm 205 is arranged later along the optical axis of the image pickup lens 200. The diaphragm 205 adjusts the aperture diameter so as to control the amount of light of the subject light flux that passes through the image pickup lens 200.

The lens driver 210 moves a focus lens included in the image pickup lens 200 so as to change the focal position and moves a zoom lens included in the image pickup lens 200 so as to change the focal length. The lens driver 210 also controls the aperture diameter of the diaphragm 205. The lens driver 210 drives a focus lens etc. on the basis of a control signal from the microcomputer 220.

The microcomputer 220 reads a program and controls the lens device 5 in accordance with the read program. The flash memory 230 is a non-volatile memory and stores various types of information such as optical data and adjustment values, etc. of the image pickup lens 200 in addition to the above program. Optical data of the image pickup lens 200 includes a focal length, the focal difference magnification at each focal position, and the distortion aberration at each focal position.

The I/F 240 is an interface that transmits and receives data between the lens device 5 and the camera main body 2. The lens driver 210 and the I/F 240 are connected to the microcomputer 220.

In accordance with a control signal obtained from the camera main body 2 via the I/F 240, the microcomputer 220 controls the lens driver 210 so as to perform focal position adjustment, zoom adjustment, etc. The microcomputer 220 transmits information such as a focus lens position, a zoom lens position, etc., to the camera main body 2. Also, the microcomputer 220 transmits optical data of the image pickup lens 200 stored in the flash memory 230 to the camera main body 2.

The camera main body 2 includes a shutter 10, an image pickup element 12, an image pickup circuit 20, an image process circuit 30, a microcomputer 40, a manipulation unit 45, a flash memory 50, a DRAM 60, a memory I/F 70, a recording medium 75, a display driver 80, a display unit 85, bus 90, etc.

The shutter 10 is arranged on the light-incident side of the camera main body 2 so as to control the exposure time by opening and closing. The image pickup element 12 includes a CCD and a CMOS, and performs a photoelectric conversion on incident light so as to output an image signal.

The image pickup circuit 20 converts an image signal into digital image data, and also performs an AE (Automatic Exposure) process and an AF (Auto Focus) process on the basis of the image data. The image pickup circuit 20 includes an analog process unit 22, an AD conversion unit 23, an AE process unit 24, an AF process unit 25, etc.

The analog process unit 22 performs amplification and a noise reduction process on an image signal. The AND conversion unit 23 converts an image signal that received an analog process into digital image data. The AE process unit 24 sets an exposure condition that leads to an appropriate exposure on the basis of image data. The AF process unit 25 detects a focal position on the basis of image data.

The image process circuit 30 performs various types of image processes on image data. The image process circuit 30 has a YC development unit 32, a compression unit 37, a decompression unit 38, etc. The YC development unit 32 converts RAW data into YC data. Further, the YC development unit 32 performs image processes such as a demosaic process, white balance correction, a color matrix, gamma correction, edge emphasis, noise reduction, etc.

When image data is recorded on the recording medium 75, the compression unit 37 compresses the image data in a prescribed format (JPEG for example). When image data that was compressed and recorded is read from the recording medium 75, the decompression unit 38 decompresses the image data in a prescribed format.

The microcomputer 40 reads a program and collectively controls the camera main body 2 and the camera 1 in accordance with the read program. The manipulation unit 45 includes a button and a touch panel, and inputs a manipulation instruction. The manipulation unit 45 includes manipulation members such as various types of input buttons and input keys such as a power button, a release button, a video button, a play button, a menu button, an OK button, etc. The manipulation unit 45 is connected to the microcomputer 40, and reports manipulation instruction content to the microcomputer 40.

The flash memory 50 is a non-volatile memory, and stores various types of data and tables in addition to the above program. The DRAM (Dynamic Random Access Memory) 60 is a temporary storage memory, and is a working area that develops image data when the image process circuit 30 performs various types of processes on the image data.

The memory I/F 70 performs control in which image data and tag data of image data are written to and read from the recording medium 75. The recording medium 75 is for example a flash memory, and is a memory for storing image data. The display driver 80 makes the display unit 85 display an image on the basis of live view image data upon image capturing or image data read from the recording medium 75 and decompressed by the decompression unit 38. The display unit 85 includes for example an LCD and an EL. The display unit 85 is a back-surface display unit provided on the back surface of the camera main body 2 or an EVF (Electronic View Finder) provided on the upper surface of the camera main body 2. Both the back-surface and the EVF may be provided to the camera main body 2.

The bus 90 is a data transfer channel for transferring various types of data read or generated in the camera main body 2 to the inside of the camera main body 2.

FIG. 2 is a function block diagram for explaining an image compositing process performed for focus bracketing photography. Focus bracketing photography is photography in which a plurality of pieces of image data are obtained while moving the focal position and the obtained pieces of image data are composed so as to obtain a composite image. By composing pixels having high spatial frequencies from among the obtained pieces of image data, an image with a large depth of field can be obtained. A plurality of images that are picked up while moving the focal position so as to constitute a composite image will be referred to as constituting images.

The entirety of the image compositing apparatus is controlled by a camera control unit 100. The camera control unit 100 is a function implemented by a software process by the microcomputer 40 that has read a program. A magnification calculation unit 110, a cutout area determination unit 120, a high-frequency wave detection unit 122, a distortion correction unit 150, a magnification correction unit 160 and an image data compositing unit 170 are also functions that are implemented by a software process by the microcomputer 40 similarly.

The magnification calculation unit 110 calculates a magnification correction value that corrects magnifications that are relatively different between constituting images. The magnification calculation unit 110 includes a focal difference magnification calculation unit 112, a distortion correction magnification calculation unit 114 and a magnification correction value calculation unit 116.

The focal difference magnification calculation unit 112 calculates focal difference magnification δf, which is a magnification that varies in accordance with each focal position of a constituting image. This is because the size of a subject changes in accordance with the focal position as an optical characteristic. Focal difference magnification δf changes in accordance with the lens characteristic, the focal length and the focal position.

The focal difference magnification calculation unit 112 obtains differences between the magnification at the reference focal position and magnifications at the focal positions that are in front of and behind the reference focal position from image-capturing conditions and the optical data stored in the flash memory 50, and calculates focal difference magnification δf. An example of a reference focal position is an AF-based focal position or a manual-based focal position. Also, the focal difference magnification calculation unit 112 is referred to as a focal difference magnification calculation processor.

The distortion correction magnification calculation unit 114 calculates, for each constituting image, distortion correction magnification δd, which is a magnification change caused by correcting a distortion aberration (which will also be referred to as distortion). Correction of distortion caused by a lens may cause pixel omission by the distortion correction, and in order to avoid this pixel omission, an enlargement/reduction process in accordance with the distortion correction is necessary. The amount of distortion varies depending upon the lens characteristic, the focal length and the focal position. The distortion correction magnification calculation unit 114 calculates distortion correction magnification δd from image-capturing conditions and optical data stored in the flash memory 50. Also, the distortion correction magnification calculation unit 114 is referred to as a distortion correction magnification calculation processor.

The magnification correction value calculation unit 116 multiplies focal difference magnification δf by distortion correction magnification δd so as to calculate total magnification δt, and calculates 1/δt=magnification correction value α. Detailed explanations will be given for focal difference magnification δf, distortion correction magnification δd and total magnification δt in the views of FIG. 5. Note that there are no particular differences in the vertical and horizontal directions of a window for focal difference magnification δf and distortion correction magnification δd. The magnification correction value calculation unit 116 is referred to as a magnification correction value calculation processor.

The cutout area determination unit 120 determines a scope (cutout area) used for image composition. When a magnification is corrected by the magnification correction unit 160 on the basis of magnification correction value α, the size (angle of view) of each constituting image changes. Also, composing images of different sizes may lead to deterioration of the quality on the periphery of the composite image. In view of this, when images cut out in a common area are composed from the constituting images after the magnification correction, the images have a common size, and accordingly there is no fear that the periphery of the composite image will deteriorate. Note that a cutout area corresponds to the image size of the composite image, and can also be referred to as an image capturing scope of the composite image. Also, "image size" can also be considered as "angle of view". Also, the cutout area determination unit 120 is also referred to as an area determination unit or an area determination processor.

Specifically, the cutout area determination unit 120 compares magnification correction values α respectively calculated in the constituting images, determines the constituting image that results in the minimum magnification correction value α, and determines a cutout area on the basis of the determined constituting image. Note that magnification correction value α is a value that is set so that when magnification correction value α above is small, the corrected value becomes smaller relatively. In other words, when magnification correction value α<1, the image size becomes relatively small after correction. A specific example will be explained in FIG. 6.

Also, the cutout area determination unit 120 may determine, as the cutout area, the size of the constituting image that has been determined to have minimum magnification correction value α. Alternatively, by increasing or decreasing a prescribed number of pixels, the cutout area determination unit 120 may determine, as the cutout area, the size modified to the size of the constituting image that has been determined.

The high-frequency wave detection unit 122 detects the amount of high-frequency component of the constituting image for determining the cutout area. The cutout area determination unit 120 may exclude, from the determination, an image with the detected high-frequency component that is equal to or lower than a prescribed value from among the constituting images. A constituting image with a small amount of high-frequency component, i.e., a constituting image that is out of focus, can be estimated to be an image of low importance. A constituting image with a low importance is treated as a reference for the size of composite images because it is not appropriated. Also, the high-frequency wave detection unit 122 is referred to as a high-frequency wave detection processor.

The distortion correction unit 150 corrects distortion of a constituting image by referring to a table that is stored in the flash memory 50 and that records the distortion aberration at each focal position. The magnification correction unit 160 corrects the magnification of each constituting image whose distortion has been corrected, on the basis of each magnification correction value α calculated by the magnification correction value calculation unit 116.

The image data compositing unit 170 cuts out images on the basis of the cutout area determined by the cutout area determination unit 120 from constituting images that received distortion correction and magnification correction, and composes the cutout images so as to generate one composite image. Also, the image data compositing unit 170 is referred to as an image compositing processor.

Also, when a composite image is generated, the image data compositing unit 170 may extract pixels with high-frequency components from each constituting image and paste pixels with high-frequency components so as to perform what is called depth composition. An image that received depth composition becomes an image having a focal depth greater than that of a single image.

Also, when a composite image is to be generated, the image data compositing unit 170 may perform a process of applying a blurring effect (blurring increase effect) to the background. Specifically, the image data compositing unit 170 calculates the subject distance of each pixel (or each object of an image) from the high-frequency component information of each constituting image detected by the high-frequency wave detection unit 122 so as to discriminate between the main subject and the background.

Then, the image data compositing unit 170 performs a process of applying a blurring effect to portions discriminated as the background (blurring increase effect). According to an image as above, it is possible to achieve an effect of emphasizing the main subject by further blurring the background.

The flow of the process will be explained briefly. Receiving an instruction for focus bracketing photography from the manipulation unit 45, the camera control unit 100 performs focus bracketing photography.

The camera control unit 100 calculates the focal position at which an image is captured, in accordance with the setting. The camera control unit 100 specifies the calculated focal position for the microcomputer 220 via the I/F 240 so as to perform image capturing at each focal position. The respective focal positions for example total to seven positions including the AF-based focal position or the manual-based focal position and three positions each in front of and behind it. Seven images are captured, correspondingly.

Also, the camera control unit 100 obtains optical data of the image pickup lens 200 from the microcomputer 220, and stores it in the flash memory 50.

Images are captured while moving the focal position, and image signals output from the image pickup element 12 receive amplification etc. by the analog process unit 22, and are output as image data from the AD conversion unit 23. The YC development unit 32 performs a prescribed process on the image data of each constituting image. The distortion correction unit 150 performs distortion correction on the image data of each constituting image.

The focal difference magnification calculation unit 112 calculates focal difference magnification δf in accordance with the focal position of each constituting image. The distortion correction magnification calculation unit 114 calculates distortion correction magnification δd in accordance with the focal position of each constituting image. The magnification correction value calculation unit 116 obtains focal difference magnification δf×distortion correction magnification δd=total magnification δt, and calculates 1/δt=magnification correction value α.

The cutout area determination unit 120 compares magnification correction values α respectively calculated in the constituting images, determines the constituting image that results in the minimum magnification correction value α, and determines a cutout area on the basis of the determined constituting image.

The magnification correction unit 160 performs magnification correction on the image of each constituting image by magnification correction value α. The image data compositing unit 170 cuts out images from the constituting images on the basis of the determined cutout area and generates one composite image by composing the cutout images. Also, the magnification correction unit 160 is referred to as a magnification correction processor.

<Image Compositing Process>

Figure 3:
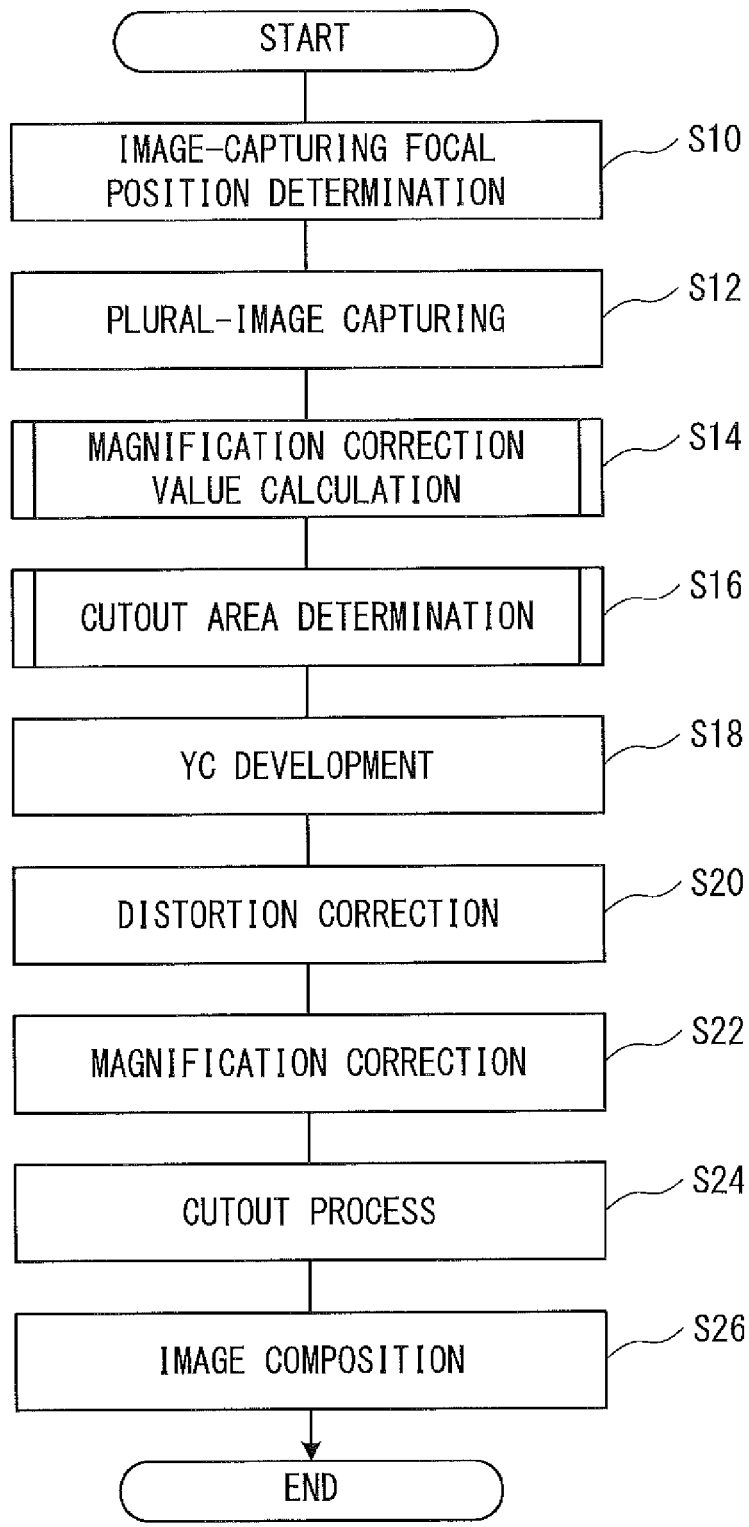
FIG. 3 is a flowchart explaining the procedures of the image compositing process.

FIG. 3 is a flowchart explaining the procedures of an image compositing process for focus bracketing photography. The camera control unit 100 determines an image-capturing focal position (step S10). The camera control unit 100 may make the AF-based focal position the center of the focal position according to the setting. Also, a plurality of focal positions for image capturing may be set automatically by the camera control unit 100 on the basis of prescribed conditions or may arbitrarily be specified by the image capturing person.

An example of automatic setting will be explained briefly. The camera control unit 100 stores the number of images captured in front of and behind the center position and the focal position interval set in advance by the image capturing person, and calculates each focal position for each AF time during image capturing. When for example the setting is that the number of images to be captured=5 and the focal position interval=1 m, in a case when the center of the focal position is 4 m, images are captured at the focal positions of 2 m, 3 m, 4 m, 5 m and 6 m.

Further, the camera control unit 100 may detect two focal positions selected in an image through a touch panel provided to the back-surface display unit and divide the space by a prescribed number of images between the two focal positions at equal intervals so as to treat them as the focal positions. Also, the camera control unit 100 may calculate the number of images to be captured so that the space between the two focal positions is captured at prescribed focal intervals. The two focal positions may be set through the MF (Manual Focus) and a button of the manipulation unit 45.

The camera control unit 100 captures images at a plurality of set focal positions (step S12). The camera control unit 100 records the captured image data in the DRAM 60.

Figure 4:
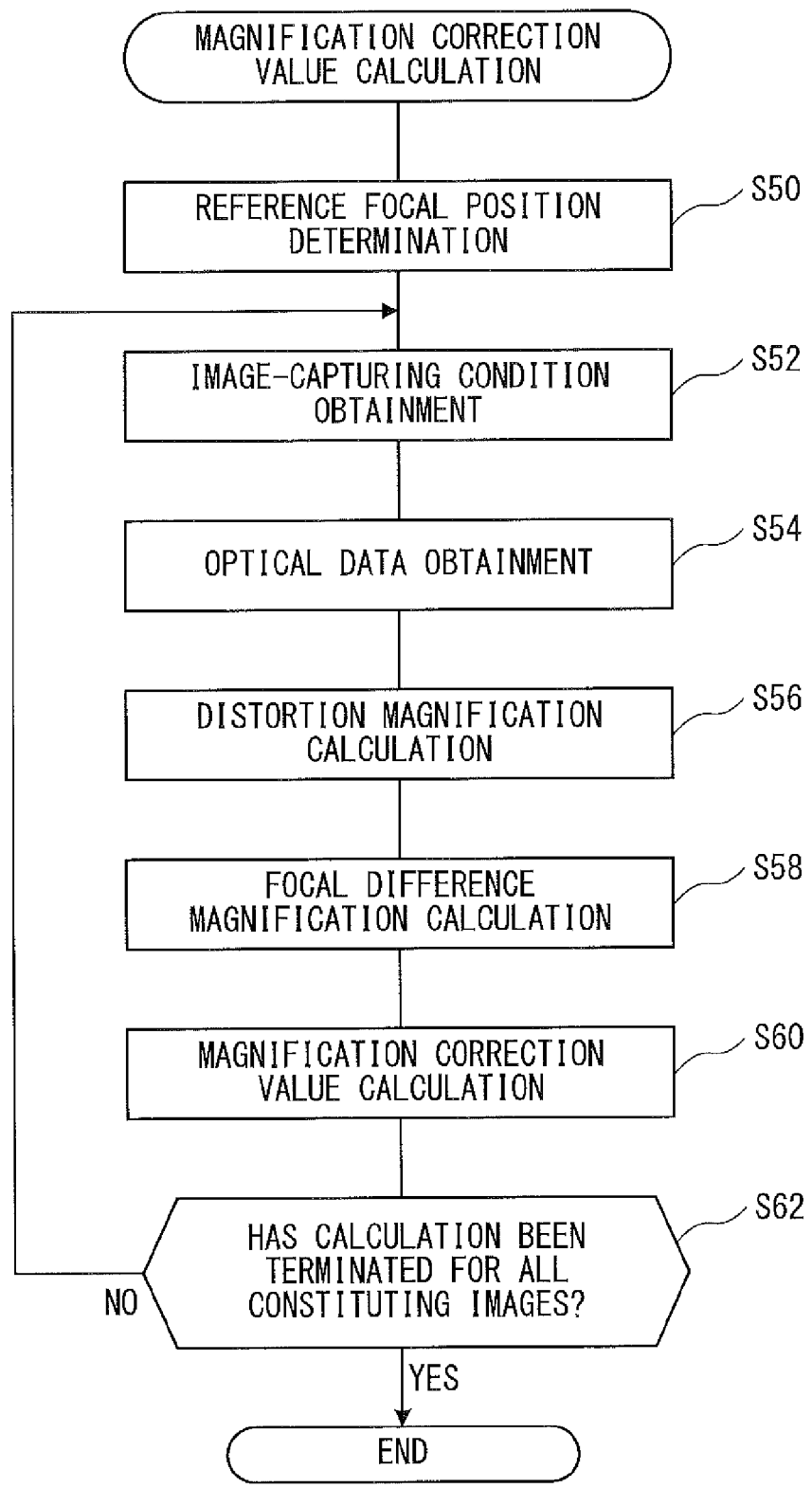
FIG. 4 is a subroutine for explaining the procedures of magnification correction value calculation.

The camera control unit 100 calculates magnification correction value α (step S14). FIG. 4 is a subroutine for explaining the procedures of calculation of magnification correction value α. The magnification calculation unit 110 determines the reference focal position (step S50). The reference focal position is a focal position functioning as a reference for calculating focal difference magnification δf. Focal difference magnification δf of a different image is calculated on an assumption that the magnification of an image captured at the reference focal position is "1". The reference focal position may be an AF-based focal position or may be for example a focal position of the close end or the infinity end. It is also possible to treat an image captured at the reference focal position as an image serving as the reference for position adjustment in a position adjustment process of an image composition in a later stage.

Next, the camera control unit 100 repeats the processes of step S52 through step S60 on all constituting images. The camera control unit 100 obtains image-capturing conditions of one constituting image (step S52). The camera control unit 100 obtains the lens type, the zoom magnification and the focal position.

The camera control unit 100 obtains the optical data (step S54). The optical data is data obtained by quantifying the distortion correction amount and focal difference magnification δf, and may be in the form of either of numerical expression and a table. The camera control unit 100 reads optical data from the flash memory 50 or the flash memory 230. The distortion correction amount and focal difference magnification δf are values that depend upon the lens used for image capturing, and thus must be values in accordance with the lens type. Optical data is stored as a value corresponding to the zoom magnification and the focal position, respectively.

The distortion correction magnification calculation unit 114 calculates distortion correction magnification δd (step S56). The distortion correction magnification calculation unit 114 calculates distortion correction magnification δd from the obtained image-capturing conditions and optical data.

The focal difference magnification calculation unit 112 calculates focal difference magnification δf (step S58). The focal difference magnification calculation unit 112 calculates focal difference magnification of from the obtained image-capturing conditions and optical data and the difference between the reference focal position and the focal position of image-capturing target image.

The magnification correction value calculation unit 116 calculates magnification correction value α (step S60). As described above, magnification correction value α=1/(total magnification δt) and total magnification δt=focal difference magnification δf×distortion correction magnification δd are satisfied.

Figure 5A:
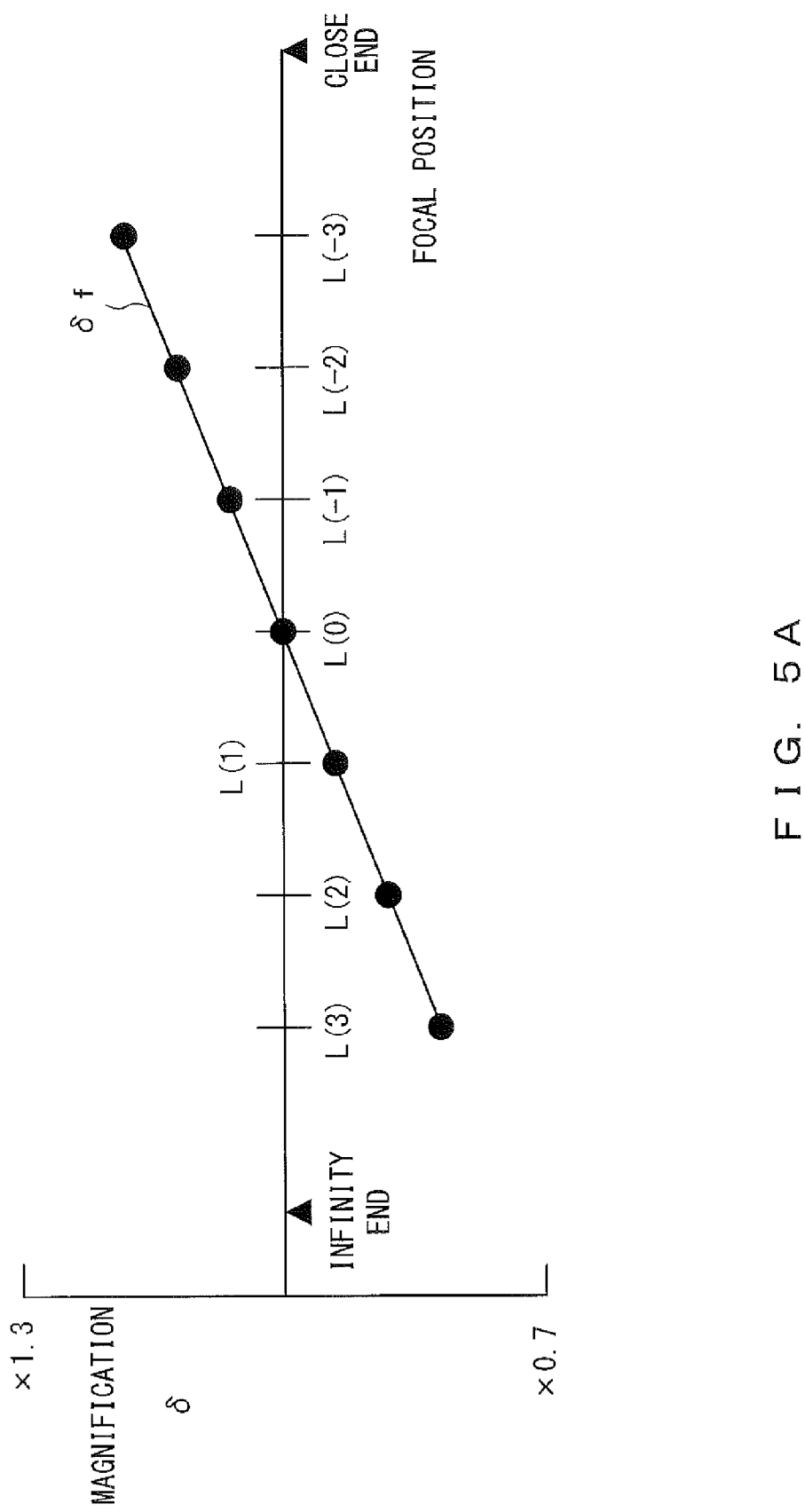
FIG. 5A is a graph of focal difference magnification δf.
Figure 5B:
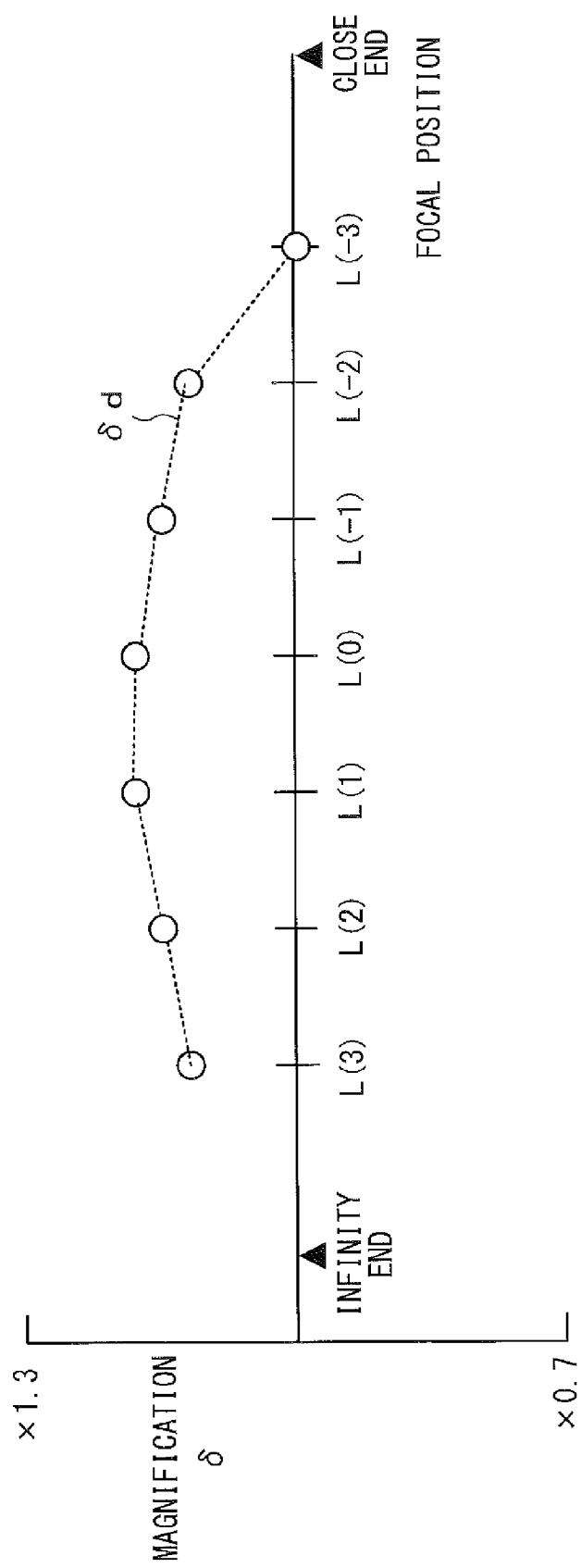
FIG. 5B is a graph of distortion correction magnification δd.
Figure 5C:
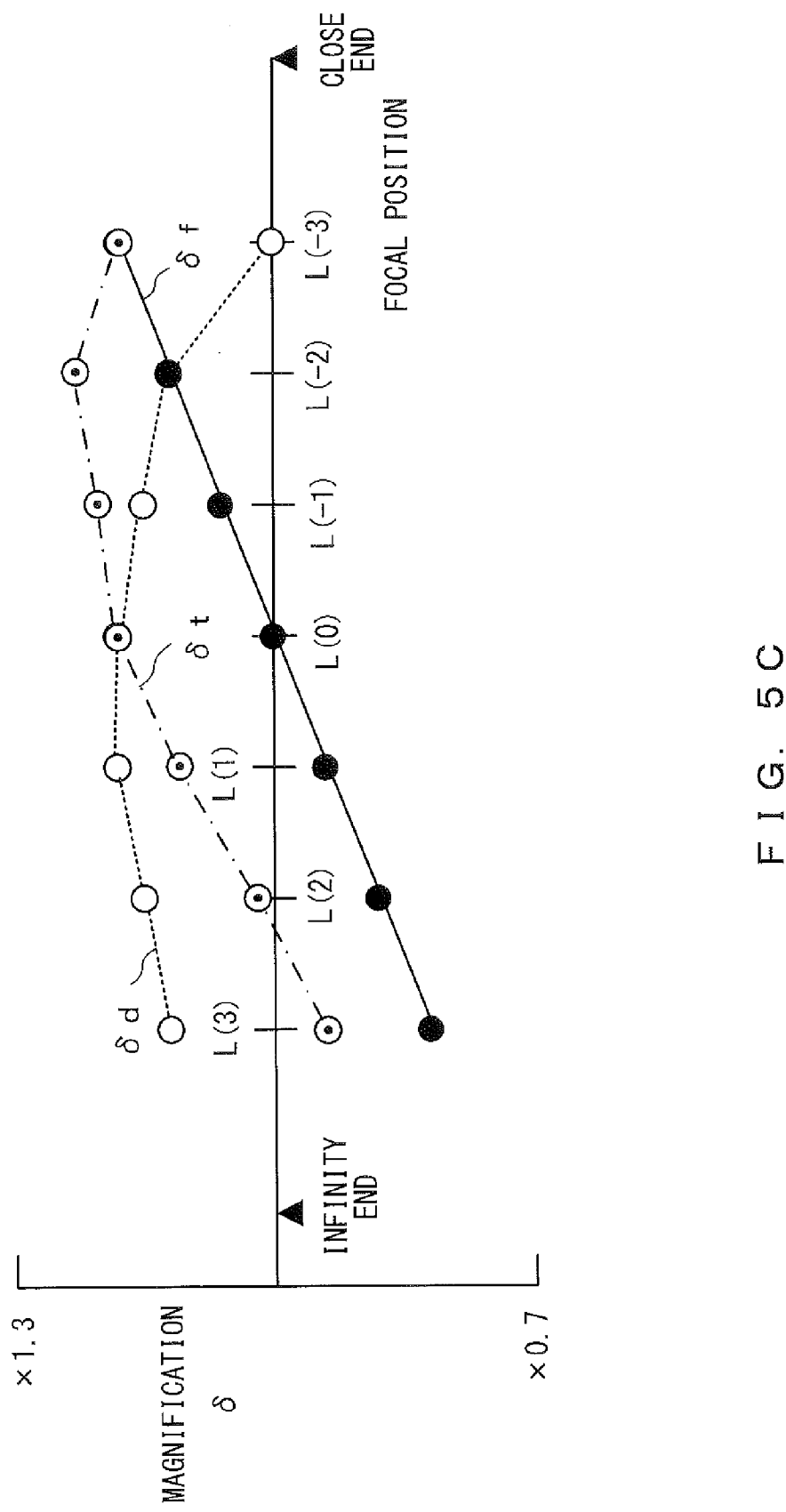
FIG. 5C is a graph showing focal difference magnification δf, distortion correction magnification δd and total magnification δt

FIG. 5A through FIG. 5C are graphs showing examples of magnification variations by a focal position. FIG. 5 represent magnification δ and focal position by the vertical axes and the horizontal axes, respectively. At a focal position satisfying magnification δ>1, the subject image is captured in an enlarged state, and at a focal position satisfying magnification δ<1, the subject image is captured in a reduced state. In other words, at a focal position satisfying magnification δ>1, the angle of view narrows, resulting in a large magnification. At a focal position satisfying magnification δ<1 by contrast, the angle of view widens, resulting in a small magnification.

Also, the right and left ends of the horizontal axes are the close and infinity ends, respectively. FIG. 5 are examples in which L(0) is the reference focal position and seven images are captured while moving the focal position around L(0), including three images each in front of and behind L(0).

FIG. 5A shows a magnification change in accordance with the position of focus in a graph of focal difference magnification δf. In this example, the subject image is captured to be the largest in the image of L(−3) on the close-end side for the image of L(0) while the subject image is captured to be the smallest in the image of focal position L(3) on the infinity-end side.

FIG. 5B shows a magnification change by distortion correction in accordance with the position of focus in a graph of distortion correction magnification δd. In this example, the subject image is captured to be the smallest in the image of L(−3) on the close-end side for the image of L(0). Also, for the image of L(0), the subject image is captured to be small also in the image of L(3).

FIG. 5C is a graph showing focal difference magnification δf, distortion correction magnification δd and total magnification δt in a superimposed manner. As described above, focal difference magnification δf×distortion correction magnification δd=total magnification δt. Total magnification δt becomes maximum at L(−2) and minimum at L(3).

Figure 6:
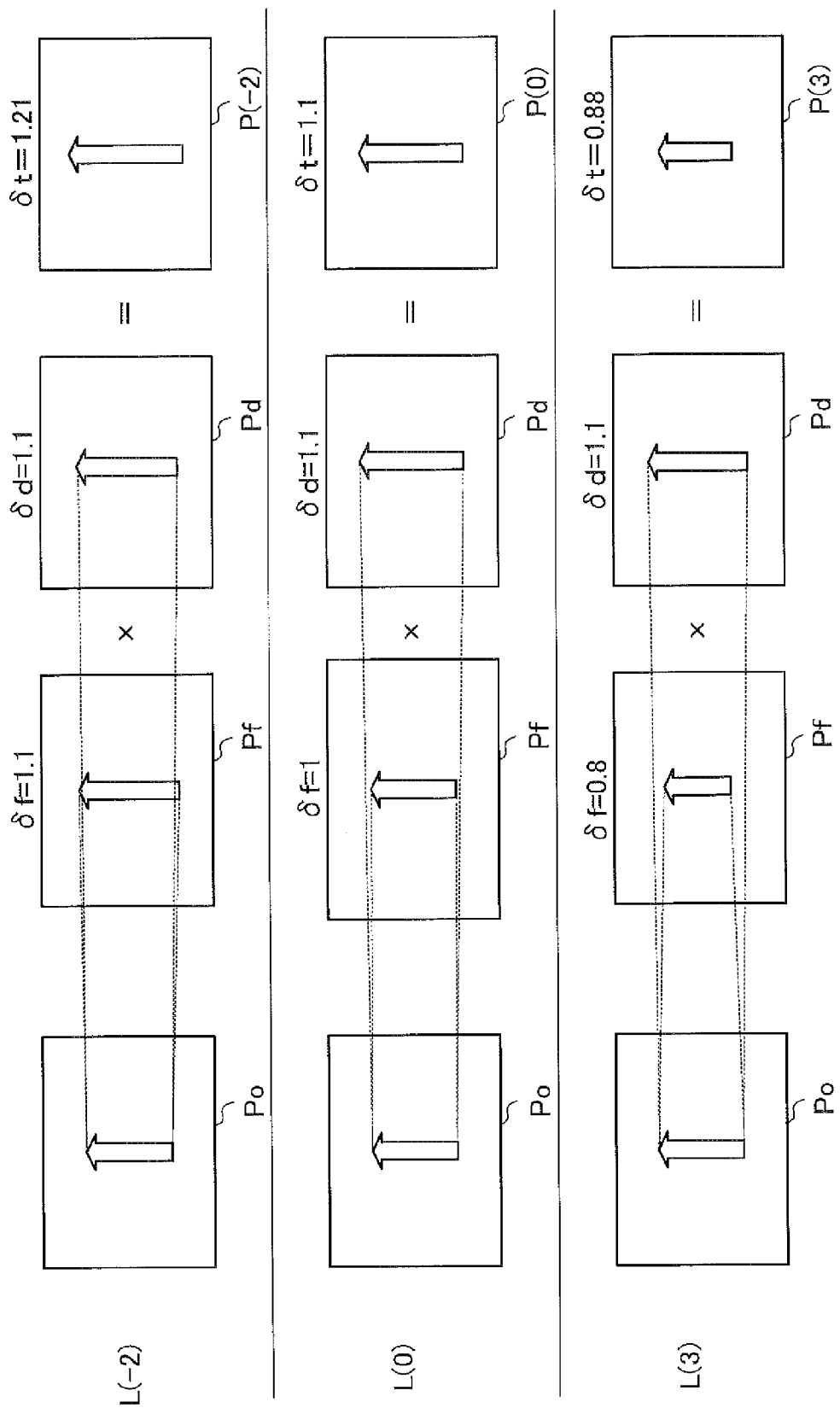
FIG. 6 shows specific changes in subject images caused by magnifications of FIG. 5A through FIG. 5C.

FIG. 6 shows specific sizes of the subject images at the magnifications of FIG. 5A through FIG. 5C. As a representative, the sizes of the subject images are shown at three focal positions of L(−2), L(0) and L(3). Image Po is a tentative image with the magnification assumed to be one. The subject images are represented by the upward pointing arrows.

At L(−2), focal difference magnification δf=1.1 because of the focal difference, and the subject image is enlarged to 1.1 times (image Pf). Also, after distortion correction, because distortion correction magnification δd=1.1, the subject image is enlarged to 1.1 times (image Pd). Then, because total magnification δt=1.21, the subject image is enlarged to 1.21 times (image P(−2)).

At L(0), because focal difference magnification δf=1, the subject image does not change (image Pf). Also, because distortion correction magnification δd=1.1, the subject image is enlarged by a factor of 1.1 (image Pd). Then, because total magnification δt=1.1, the subject image is enlarged by a factor of 1.1 (image P(0)).

At L(3), because focal difference magnification δf=0.8, the subject image is reduced by a factor of 0.8 (image Pf). Also, because distortion correction magnification δd=1.1, the subject image is enlarged by a factor of 1.1 (image Pd).

Then, because total magnification δt=0.88, the subject image is reduced by a factor of 0.88 (image P(3)).

The process proceeds to step S62 in FIG. 4. The camera control unit 100 determines whether or not the calculation has been terminated for the magnification correction values of all constituting images.

Determining that the calculation has not been terminated for the magnification correction values of all constituting images (No in step S62), the camera control unit 100 returns to step S52. Determining that calculation has been terminated for the magnification correction values of all constituting images (Yes in step S62), the camera control unit 100 proceeds to step S16 in FIG. 3.

Figure 7:
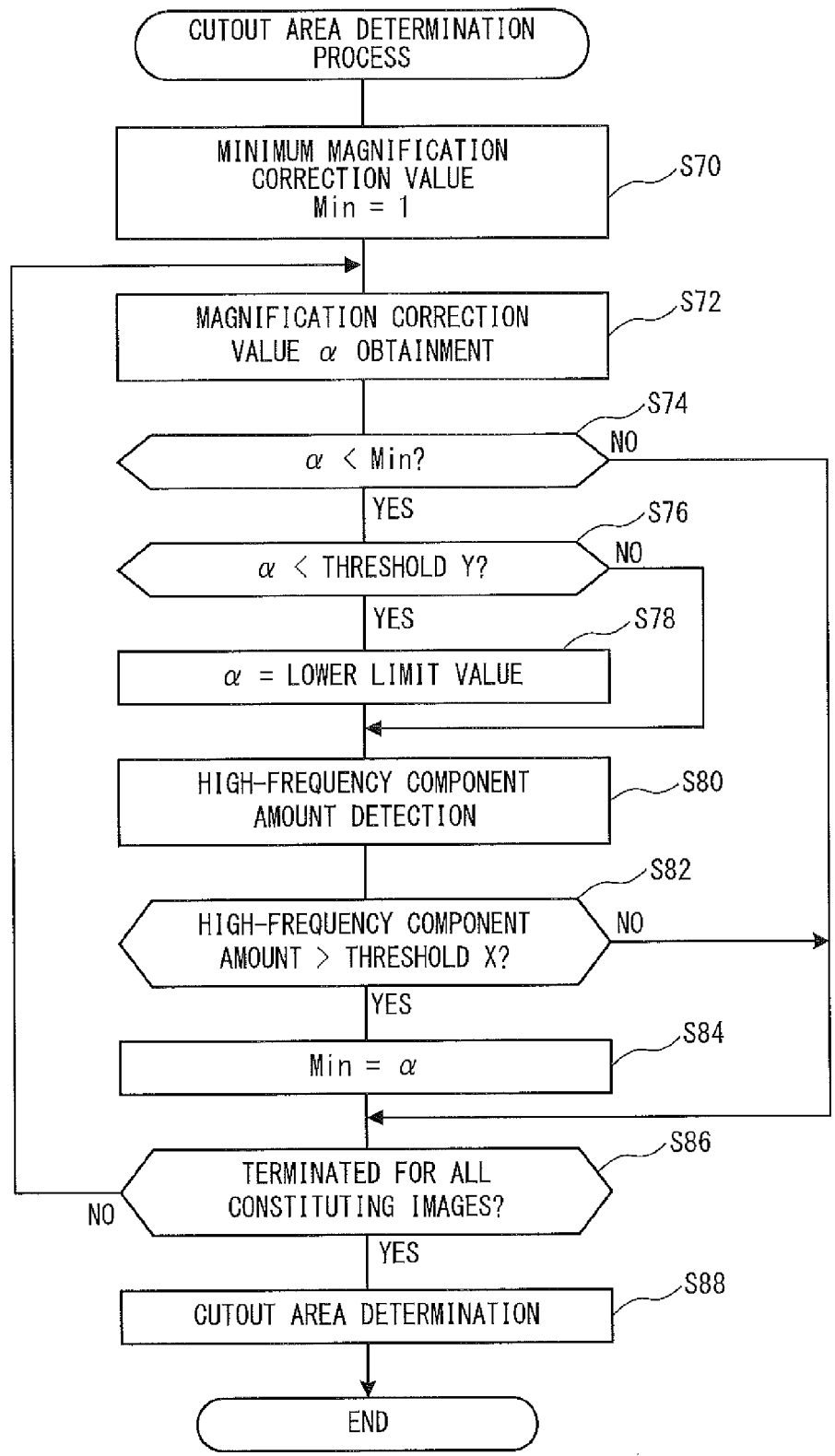
FIG. 7 is a subroutine for explaining the procedures of a cutout area determination process.

Again FIG. 3 is referred to. The camera control unit 100 performs a cutout area determination process (step S16). FIG. 7 is a subroutine for explaining the procedures of the cutout area determination process.

The cutout area determination unit 120 initializes minimum magnification correction value Min so that Min=1 (step S70). Minimum magnification correction value min is the minimum value for magnification correction value α. The cutout area determination unit 120, in step S72 through step S84 below, compares magnification correction values α of constituting images sequentially, and determines minimum magnification correction value Min. Hereinafter, explanations will be given by using FIG. 5 as an example on an as-needed basis.

The cutout area determination unit 120 obtains magnification correction value α from the magnification calculation unit 110 (step S72). The cutout area determination unit 120 first obtains magnification correction value α of L(−3) for example.

The cutout area determination unit 120 determines whether or not obtained magnification correction value α<minimum magnification correction value Min (step S74). Determining that magnification correction value α<minimum magnification correction value Min is not satisfied (No in step S74), the cutout area determination unit 120 proceeds to step S86.

Determining that magnification correction value α<minimum magnification correction value Min (Yes in step S74), the cutout area determination unit 120 determines whether or not magnification correction value α<threshold Y (step S76). Threshold Y is the lower limit value, set in advance, for minimum magnification correction value Min. This is because when minimum magnification correction value Min becomes equal to or smaller than a prescribed value, the size (angle of view) of the composite image becomes too narrow, leading to a fear that it will become opposed to the intention of the image capturing person. For example, threshold Y=0.7.

Determining that magnification correction value α<threshold Y (Yes in step S76), the cutout area determination unit 120 sets α as the lower limit value (step S78). The lower limit value may be the same as threshold Y or may be different. By setting a clip process as described above, it is possible to manage the lower limit of the size (angle of view) of the composite image. Determining that magnification correction value α<threshold Y is not satisfied (No in step S76), the cutout area determination unit 120 proceeds to step S80.

The high-frequency wave detection unit 122 detects high-frequency components of the corresponding constituting image (step S80). The high-frequency wave detection unit 122 extracts an edge in the image on the basis of the image data for example and treats the total number of the pixels detected as an edge as the amount of a high-frequency component.

The cutout area determination unit 120 compares the detected amount of a high-frequency component with threshold X and determines whether or not amount of the high-frequency component>threshold X (step S82). Threshold X is a value set in advance. A constituting image having a small amount of the high-frequency component does not become a main constituting image for composition, and accordingly is excluded from the cutout area determination. Determining that the amount of the high-frequency component>threshold X is not satisfied (No in step 82), the cutout area determination unit 120 excludes the corresponding constituting image, and proceeds to step S86.

Determining that the amount of the high-frequency component>threshold X (Yes in step S82), the cutout area determination unit 120 updates minimum magnification correction value Min to the value of this magnification correction value $\alpha$ (step S84).

The cutout area determination unit 120 determines whether or not a comparison determination has been terminated for all constituting images (step S86). Determining that a comparison determination has not bee terminated for all constituting images (No in step S86), the cutout area determination unit 120 proceeds to step S72, and performs a comparison determination for magnification correction value $\alpha$ of the next constituting image.

Determining that comparison determination has been terminated for all constituting images (Yes in step S86), the cutout area determination unit 120 determines a cutout area on the basis of determined minimum magnification correction value Min (step S86). On the basis of the size of an image corrected by minimum magnification correction value Min, the cutout area determination unit 120 determines a cutout area. Specifically, the cutout area determination unit 120 may determine the size of an image corrected by minimum magnification correction value Min to be a cutout area or may determine a size obtained by adding/subtracting a prescribed number of pixels to/from the size of an image that is to be corrected by a minimum magnification correction value Min.

Explanation returns to FIG. 3. The YC development unit 32 performs a YC development process (step S18). As described above, the YC development unit 32 converts RAW data into YC data, and further performs image processes such as a demosaic process, white balance correction, etc.

The distortion correction unit 150 corrects distortion (a distortion aberration) of a constituting image by referring to a table that is stored in the flash memory 50 and that records the distortion aberration at each focal position (step S20). The magnification correction unit 160 performs magnification correction on a constituting image that received distortion correction, using each corresponding magnification correction value $\alpha$ that was calculated by the magnification correction value calculation unit 116 (step S22).

The image data compositing unit 170 performs a cutout process of each constituting image that received magnification correction, on the basis of a determined cutout area (step S24), and composes the constituting images that received a cutout process so as to generate a composite image.

Figure 8:
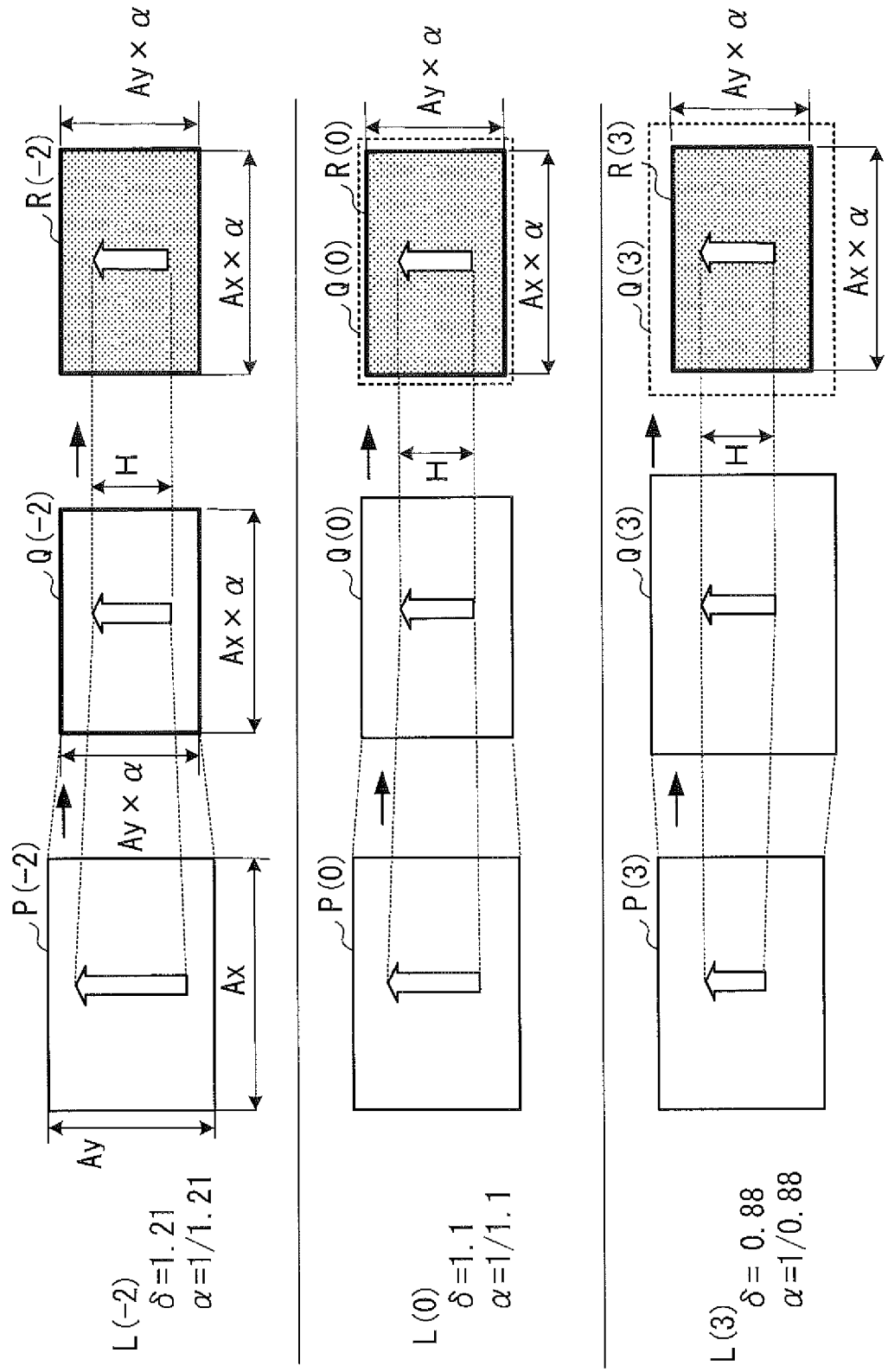
FIG. 8 shows a constituting image, a magnification correction image and a cutout image in comparison.

Specific explanations will be given for a relationship between a cutout area and a composite image by referring to FIG. 8 and FIG. 9. FIG. 8 shows a constituting image, a magnification correction image and a cutout image in comparison. Similarly to the example of FIG. 6, three constituting images of L(−2), L(0), and L(3) are exemplified. Magnification correction value $\alpha$ (1/1.21) of L(−2) is assumed to be minimum magnification correction value Min.

At L(−2), image P(−2) receives magnification correction, and the subject image is reduced so that it becomes magnification correction image Q(−2). The number of pixels in the vertical direction and horizontal direction of magnification correction image Q becomes a times that of image P. Because magnification correction value $\alpha$ (1/1.21) at L(−2) is minimum magnification correction value Min, the size of magnification correction image Q(−2) is determined to be a cutout area. In other words, the size of magnification correction size Q(−2) becomes the size of cutout image R(−2). When the numbers of pixels in the horizontal and vertical directions of image P(−2) are assumed to be Ax an Ay, respectively, the numbers of pixels in the horizontal and vertical directions of magnification correction image Q (−2) are Ax×$\alpha$ and Ay×$\alpha$, respectively. Also in cutout image R(−2), the numbers of pixels in the horizontal and vertical directions are Ax×$\alpha$ and Ay×$\alpha$, respectively.

At L(0), image P(0) receives magnification correction, and the subject image is reduced so that it becomes magnification correction image Q(0). Image height H of magnification correction image Q(0) becomes equal to that of magnification correction image Q(−2). The same size as magnification correction image Q(−2) receives a cutout process from magnification correction image Q(0), resulting in cutout image R(0). Cutout image R(0) has the same size as that of cutout image R(−2).

At L(3), image P(3) receives magnification correction, and the subject image is enlarged, resulting in magnification correction image Q(3). Image height H of magnification correction image Q(3) becomes equal to that of magnification correction image Q(−2) and magnification correction image Q(0). The same size as magnification correction image Q(−2) receives a cutout process from magnification correction image Q(3), resulting in cutout image R(3). Cutout image R(3) has the same size as that of cutout image R(−2).

Figure 9:
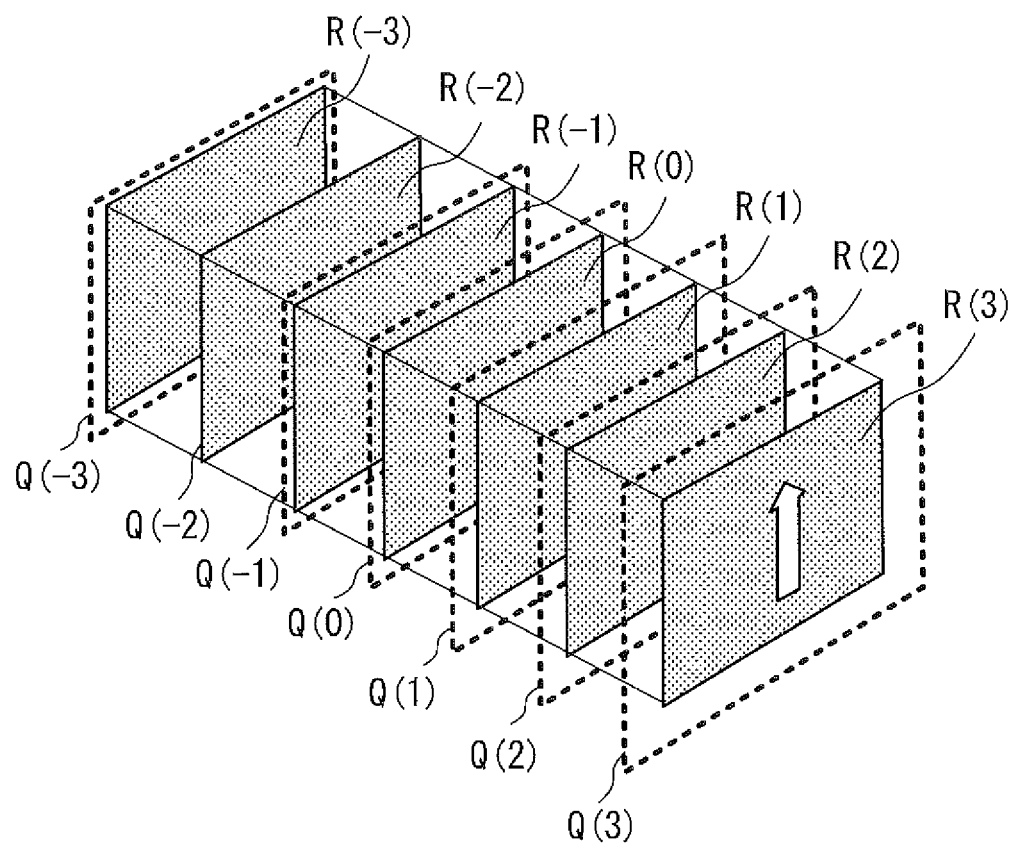
FIG. 9 schematically arranges constituting images at positions L(−3) through L(3) that are to be composed.

FIG. 9 schematically shows constituting images at positions L(−3) through L(3). The dashed lines represent the outlines of magnification correction images Q, and the hatched areas represent the sizes of cutout images R. Cutout image R of each constituting image has the same size as the size (angle of view) of cutout image R(−2). Cutout images R(−3) through R(3) have identical image heights and sizes (angles of view).

<Image Composition in Live View and Video Capturing Mode>

In the above embodiment, an image compositing process based on focus bracketing photography in the still image capturing mode has been explained; however, focus bracketing photography can also be performed during live viewing and during the video capturing mode.

Figure 10:
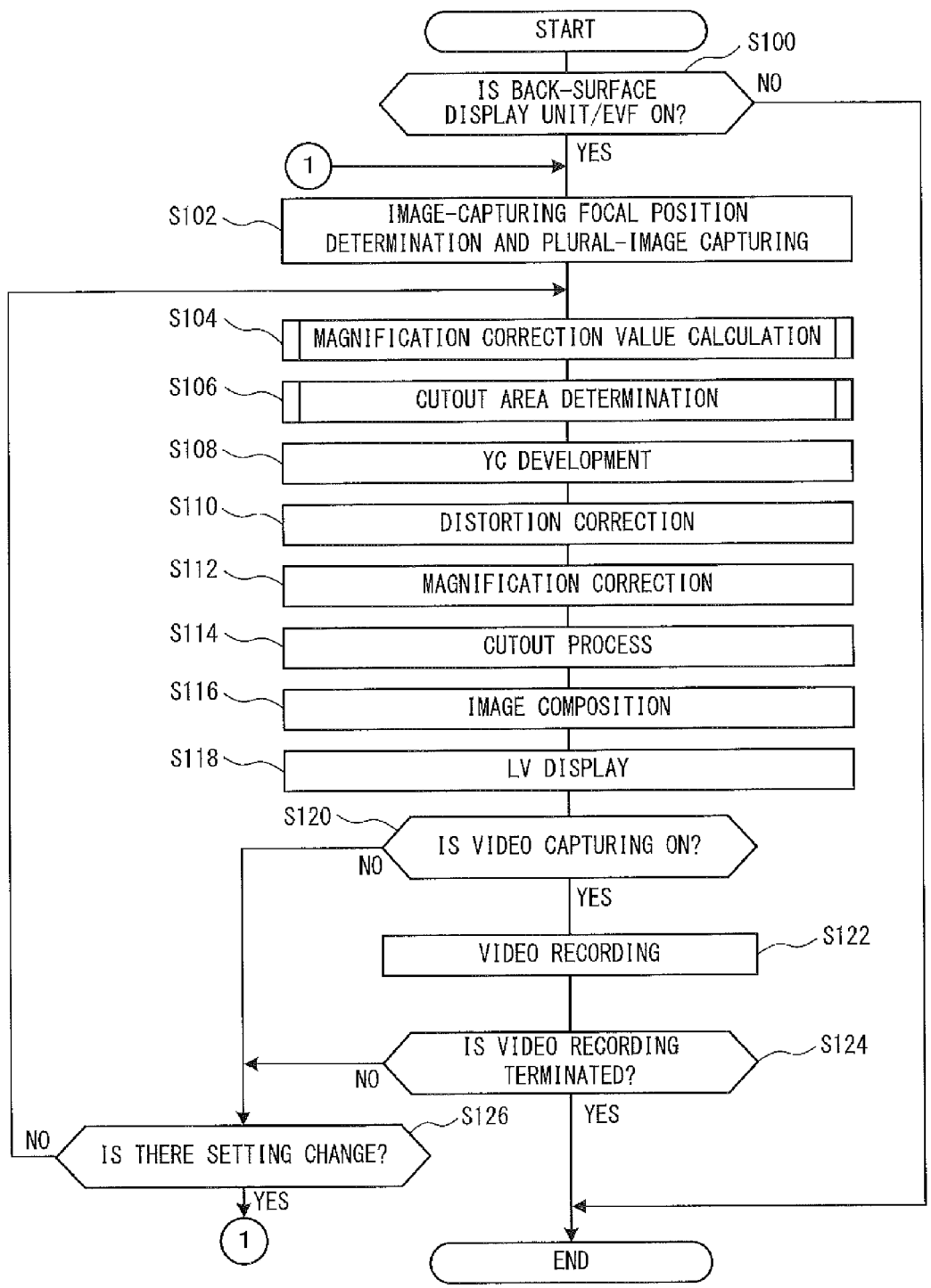
FIG. 10 is a flowchart explaining the procedures of a composite image display during live viewing and video recording of a composite image.

FIG. 10 is a flowchart explaining the procedures of composite image display during live viewing and video recording of composite image. The camera control unit 100 determines that back-surface display unit/EVF is in an on state (step S100). In a case of the camera 1 being provided with an optical finder in addition to the display unit 85 such as the back-surface display unit, the EVF, etc., the operations of the display unit 85 such as the back-surface display unit, the EVF, etc. are determined. In a case of the camera 1 not being provided with an optical finder, step S100 is omitted. Determining that back-surface display unit (No in step S100), the camera control unit 100 terminates this process.

Determining that one of the back-surface display unit/EVF is in an on state (Yes in step S100), the camera control unit 100 performs image-capturing focal position determination and plural-image capturing as explained in step S10 and step S12 (step S102).

The camera control unit 100 performs magnification correction value calculation (step S104), cutout area determination (step S106), YC development (step S108), distortion correction (step S110), magnification correction (step S112), a cutout process (step S114), and image composition (step S116). Step S104 through step S116 are similar to step S14 through step S26 described above, and thus explanations thereof will be omitted.

The camera control unit 100 performs live view display of a generated composite image on the display unit 85 (step S118). The camera control unit 100 determines whether or not video capturing is on (step S120). When the video button included in the manipulation unit 45 is pushed, the camera control unit 100 turns on video capturing. Determining that video capturing is on (Yes in step S120), the camera control unit 100 records the composite image as a video in the recording medium. 75 (step S122). The camera control unit 100 determines whether or not the video capturing has been terminated by a manipulation of the video button (step S124), and when determining that the video capturing has been terminated (Yes in step S124), it terminates the capturing.

Determining that video capturing is not on (No in step S120), the camera control unit 100 determines whether or not a setting change has been made (step S126). A setting change is a change in conditions related to focus bracketing photography, and includes changes in the zoom magnification (focal length), the subject that is to be brought into focus, etc.

Determining that a setting change has not been made (No in step S126), the camera control unit 100 returns to step S104. Determining that a setting change has been made (Yes in step S126), the camera control unit 100 returns to step S102. Also, determining that video capturing has not been terminated (No in step S124), the camera control unit 100 proceeds to step S126.

In a plurality of images captured at different focal positions, two magnification changes, i.e., a magnification change based on focal positions and a magnification change based on distortion correction, occur. In view of this, the conventional focus bracketing photography composed images in which the magnification variations (δf, δd) of respective constituting images caused by differences of focal positions are corrected and the subject sizes (image heights) are made identical, and generated a composite image. However, due to correction of magnification variations, the image sizes (angles of view) varied between the respective constituting images. Also, there was a fear that composing images of different image sizes would deteriorate the image quality on the periphery of the composite image.

In view of this, the present embodiment cuts out images in a common size (angle of view) from images that received magnification variation correction, so as to compose cutout images having the common sizes. Thereby, a composite image without image deterioration on the periphery can be obtained. As described above, the present embodiment can provide an image compositing apparatus that, when a plurality of images captured at different focal positions are to be composed, adjusts changes in the image size caused by the magnification correction of each image so as to generate an appropriate composite image.

Also, the present embodiment determines a cutout area on the basis of a constituting image resulting in minimum magnification correction value α, i.e., a constituting image with a minimum size (angle of view), making it possible to prevent an image without pixel data on the periphery from being generated. Also, a constituting image having low high-frequency components is excluded from selection for cutout area determination, making it possible to prevent an image of low importance from becoming a reference for composite image sizes. This is because a constituting image with low high-frequency components can be estimated to be an image of low importance.

Also, when a constituting image whose magnification correction value is equal to or smaller than a prescribed value is excluded from selection for cutout area determination, it is possible to prevent the size of the composite image from becoming too small.

Also, the present embodiment also corrects the distortion (distortion aberration) of each constituting image, making it possible to obtain a composite image with fewer distortion aberrations.

As described above, the image compositing apparatus according to the present embodiment can obtain a composite image, with a large depth of field, in which each subject is expressed sharply and the periphery of the image is finished naturally.

<Variation Example of Embodiment>

In the present embodiment, explanations were given for an example in which magnification correction, cutout process, etc. are performed on captured constituting images upon their capturing in order to generate a composite image; however, it is also possible to store captured constituting images in the recording medium 75 so as to perform magnification correction, a cutout process, etc. after the capturing in order to generate a composite image. In other words, the image compositing apparatus may be mounted not only on an image capturing apparatus such as a camera but also on an image processing apparatus etc. having an image processing function. Also, image composition after their capturing allows the processing time to be later than image composition upon their capturing.

In the present embodiment, it was described that magnification correction value calculation (step S14), YC development (step S18), distortion correction (step S20) and magnification correction (step S20) were processed sequentially, while the order of these processes is arbitrary. For example, in a stage of RAW data before the YC development, distortion correction and magnification correction may be performed.

Also, the processes of respective constituting images by the process units of the YC development unit 32, the distortion correction unit 150 and the magnification correction unit 160 may be performed sequentially by the above process units one by one on each constituting image or may be performed collectively on all constituting images for each of the above process units.

The camera control unit 100 may be implemented by a hardware configuration entirely or partially instead of a software process by the microcomputer 40. Similarly, the respective units of the magnification calculation unit 110, the cutout area determination unit 120, the high-frequency wave detection unit 122, the distortion correction unit 150, the magnification correction unit 160 and the image data compositing unit 170 may be partially or entirely implemented by a hardware configuration.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OR NUMERALS

1 CAMERA
2 CAMERA MAIN BODY
5 LENS DEVICE
10 SHUTTER
12 IMAGE PICKUP ELEMENT
20 IMAGE PICKUP CIRCUIT
22 ANALOG PROCESS UNIT
23 AD CONVERSION UNIT
24 AE PROCESS UNIT
25 AF PROCESS UNIT
30 IMAGE PROCESS CIRCUIT
32 YC DEVELOPMENT UNIT
40 MICROCOMPUTER
45 MANIPULATION UNIT
50 FLASH MEMORY
60 DRAM
70 MEMORY I/F
75 STORAGE MEDIUM
80 DISPLAY DRIVER
85 DISPLAY UNIT
90 BUS
100 CAMERA CONTROL UNIT
110 MAGNIFICATION CALCULATION UNIT
112 FOCAL DIFFERENCE MAGNIFICATION CALCULATION UNIT
114 DISTORTION CORRECTION MAGNIFICATION CALCULATION UNIT
116 MAGNIFICATION CORRECTION VALUE CALCULATION UNIT
120 CUTOUT AREA DETERMINATION UNIT
122 HIGH-FREQUENCY WAVE DETECTION UNIT
150 DISTORTION CORRECTION UNIT
160 MAGNIFICATION CORRECTION UNIT
170 IMAGE DATA compositing UNIT
200 IMAGE PICKUP LENS
205 DIAPHRAGM
210 LENS DRIVER
220 MICROCOMPUTER
230 FLASH MEMORY
240 I/F

What is claimed is:

1. An image compositing apparatus for generating a composite image by composing a plurality of images captured while changing a focal position,
the apparatus comprising:
a memory that stores a computer program and data required to perform processing; and
a computer that is connected to the memory and that performs processing according to the computer program,
the computer comprising:
a focal difference magnification calculation processor that calculates, for the plurality of images, a focal difference magnification, which is a magnification that changes in accordance with a difference between focal positions at which images are captured;
a distortion correction magnification calculation processor that calculates, for the plurality of images, a distortion correction magnification, which is a magnification that changes when an image distortion in accordance with a focal position at which an image is captured is corrected;
a magnification correction value calculation processor that calculates, for the plurality of images, a magnification correction value that corrects a magnification of the plurality of images so that image heights of the plurality of images that are changed by the focal difference magnification and the distortion correction magnification are consistent; and
an area determination processor that determines an area used as an image for an image composition from among the plurality of images whose magnification was corrected by the magnification correction value, wherein
the area determination processor determines an image that results in a minimum magnification correction value from among the plurality of images, and determines the area on the basis of the determined image.

2. The image compositing apparatus according to claim 1, comprising
a high-frequency wave detection processor that detects an amount of a high-frequency component of an image, wherein
the area determination processor excludes, from the determination, an image for which an amount of the high-frequency component equal to or smaller than a prescribed amount was detected, from among the plurality of images.

3. The image compositing apparatus according to claim 1, wherein
the area determination processor excludes, from the determination, an image for which a corresponding magnification correction value is equal to or smaller than a prescribed value from among the plurality of images.

4. The image compositing apparatus according to claim 1, wherein
the focal difference magnification calculation processor calculates the focal difference magnification on the basis of an image-capturing condition including at least one of a focal position, a focal length or lens type.

5. The image compositing apparatus according to claim 1, comprising:
a magnification correction processor that corrects a magnification of the plurality of images on the basis of the magnification correction value; and
an image compositing processor that generates the composite image by cutting out images of a prescribed area on the basis of the determined area from among a plurality of images that received magnification correction by the magnification correction processor, and composes the plurality of images that were cut out so as to generate a composite image.

6. An image compositing method for generating a composite image by composing a plurality of images captured while changing a focal position, the method comprising:
a focal difference magnification calculation process that calculates, for the plurality of images, a focal difference magnification, which is a magnification that changes in accordance with a difference between focal positions at which images are captured;
a distortion correction magnification calculation process that calculates, for the plurality of images, a distortion correction magnification, which is a magnification that changes when an image distortion in accordance with a focal position at which an image is captured is corrected;

a magnification correction value calculation process that calculates, for the plurality of images, a magnification correction value that corrects a magnification of the plurality of images so that image heights of the plurality of images that are changed by the focal difference magnification and the distortion correction magnification are consistent; and an area determination process that determines an area used as an image for an image composition from among the plurality of images whose magnification was corrected by the magnification correction value, wherein the area determination process determines an image that results in a minimum magnification correction value from among the plurality of images, and determines the area on the basis of the determined image.

7. A non-transitory computer-readable medium storing a computer program for making a computer of a camera execute an image compositing method for generating a composite image by composing a plurality of images captured while changing a focal position, the program comprising:

a focal difference magnification calculation process that calculates, for the plurality of images, a focal difference magnification, which is a magnification that changes in accordance with a difference between focal positions at which images are captured;

a distortion correction magnification calculation process that calculates, for the plurality of images, a distortion correction magnification, which is a magnification that changes when an image distortion in accordance with a focal position at which an image is captured is corrected;

a magnification correction value calculation process that calculates, for the plurality of images, a magnification correction value that corrects a magnification of the plurality of images so that image heights of the plurality of images that are changed by the focal difference magnification and the distortion correction magnification are consistent; and an area determination process that determines an area used as an image for an image composition from among the plurality of images whose magnification was corrected by the magnification correction value, wherein the area determination process determines an image that results in a minimum magnification correction value from among the plurality of images, and determines the area on the basis of the determined image.

* * * * *